US012195574B2

(12) United States Patent
Adkins et al.

(10) Patent No.: US 12,195,574 B2
(45) Date of Patent: Jan. 14, 2025

(54) POLYMER POLYOL COMPOSITIONS AND THEIR USE IN THE PRODUCTION OF FLEXIBLE POLYURETHANE FOAMS

(71) Applicant: Covestro LLC, Pittsburgh, PA (US)

(72) Inventors: Rick L. Adkins, Canonsburg, PA (US); Brian L. Neal, Pittsburgh, PA (US); Andrew S. Frazee, Evansville, IN (US)

(73) Assignee: Covestro LLC, Pittsburgh, PA (US)

( * ) Notice: Subject to any disclaimer, the term of this patent is extended or adjusted under 35 U.S.C. 154(b) by 574 days.

(21) Appl. No.: 17/625,107

(22) PCT Filed: Jun. 24, 2020

(86) PCT No.: PCT/US2020/039280
§ 371 (c)(1),
(2) Date: Jan. 6, 2022

(87) PCT Pub. No.: WO2021/007028
PCT Pub. Date: Jan. 14, 2021

(65) Prior Publication Data
US 2022/0275138 A1 Sep. 1, 2022

Related U.S. Application Data

(60) Provisional application No. 62/872,401, filed on Jul. 10, 2019.

(51) Int. Cl.
C08G 18/08 (2006.01)
C08G 18/32 (2006.01)
C08G 18/40 (2006.01)
C08G 18/63 (2006.01)
C08G 101/00 (2006.01)
C08K 5/18 (2006.01)
C08L 75/00 (2006.01)

(52) U.S. Cl.
CPC ......... *C08G 18/0876* (2013.01); *C08G 18/14* (2013.01); *C08G 18/3243* (2013.01); *C08G 18/409* (2013.01); *C08G 18/632* (2013.01); *C08K 5/18* (2013.01); *C08L 75/00* (2013.01); C08G 2101/00 (2013.01); C08G 2110/0008 (2021.01)

(58) Field of Classification Search
CPC .............. C08G 18/0876; C08G 18/14; C08G 18/3243; C08G 2101/00; C08G 2110/0008; C08G 18/409; C08G 18/632; C08K 5/18; C08L 75/00
See application file for complete search history.

(56) References Cited

U.S. PATENT DOCUMENTS

| 3,330,777 | A | 7/1967 | Louvar et al. |
| 3,767,628 | A | 10/1973 | Kline |
| 4,855,346 | A | 8/1989 | Battey et al. |
| 5,066,824 | A | 11/1991 | Mafoti et al. |
| 5,096,974 | A * | 3/1992 | MacLeay ............. C08F 8/30 525/379 |
| 5,159,048 | A | 10/1992 | Cassidy et al. |
| 5,175,312 | A | 12/1992 | Dubs et al. |
| 5,219,892 | A | 6/1993 | Suhoza |
| 5,231,217 | A | 7/1993 | Yeater et al. |
| 5,422,415 | A | 6/1995 | Michaelis |
| 5,869,565 | A | 2/1999 | Clauss |
| 6,676,849 | B2 | 1/2004 | DeMassa |
| 7,910,642 | B2 | 3/2011 | Mader et al. |
| 9,505,881 | B1 | 11/2016 | Adkins et al. |
| 9,951,174 | B2 | 4/2018 | Hager et al. |
| 10,040,903 | B2 | 8/2018 | Adkins et al. |
| 10,066,047 | B2 | 9/2018 | George et al. |
| 2006/0167207 | A1 | 7/2006 | Thiele et al. |
| 2007/0185250 | A1 | 8/2007 | Mader et al. |
| 2008/0103074 | A1 | 5/2008 | Stokes et al. |
| 2009/0182078 | A1 | 7/2009 | Goh et al. |
| 2011/0054220 | A1 | 3/2011 | Goh et al. |
| 2013/0203880 | A1 | 8/2013 | George et al. |
| 2016/0208040 | A1 | 7/2016 | Cookson et al. |
| 2016/0215113 | A1 | 7/2016 | Cookson et al. |
| 2018/0155487 | A1 | 6/2018 | Otero Martinez et al. |
| 2018/0201730 | A1 | 7/2018 | Adkins |

FOREIGN PATENT DOCUMENTS

| CA | 2227346 A1 | 7/1998 |
| CN | 107652426 A | 2/2018 |
| DE | 19630904 A1 | 2/1998 |
| EP | 1428847 A1 | 6/2004 |
| GB | 869117 A | 5/1961 |

(Continued)

OTHER PUBLICATIONS

Clauss, M., "Antioxidants systems for stabilization of flexible polyurethane slabstock foam", Journal of Cellular Plastics, vol. 33, pp. 457-476 (1997).
U.S. Appl. No. 17/625,110, filed Jan. 6, 2022, entitled: Polyethers and Their Use in the Production of Flexible Polyurethane Foams, Adkins et al.
U.S. Appl. No. 17/625,112, filed Jan. 6, 2022, entitled: Polymer Polyol Compositions and Their Use in the Production of Flexible Polyurethane Foams, Adkins et al.
U.S. Appl. No. 17/625,114, filed Jan. 6, 2022, entitled: Amino Diphenylamine-Started Polyether Polyols, Methods for Their Production, and Flexible Polyurethane Foams Produced Using Such Polyols, Adkins et al.

(Continued)

Primary Examiner — Rabon A Sergent
(74) Attorney, Agent, or Firm — Donald R. Palladino

(57) ABSTRACT

Disclosed are polymer polyol compositions that include an amino diphenylamine, optionally in combination with other antioxidants, such as phenolic antioxidants, as well the use of such polymer polyol compositions in the production of flexible polyurethane foams. The polyurethane foam includes a reaction product of a polyisocyanate component and an isocyanate-reactive component that includes the polymer polyol composition.

20 Claims, No Drawings

(56) References Cited

FOREIGN PATENT DOCUMENTS

| | | |
|---|---|---|
| GB | 1164277 A | 9/1969 |
| GB | 1177636 A | 1/1970 |
| GB | 1456240 A | 11/1976 |
| JP | H10330770 A | 12/1998 |
| WO | 9916084 A1 | 4/1999 |

OTHER PUBLICATIONS

Anonymous: "Aryl—Wikipedia", May 9, 2020, XP055723955, Retrieved from the Internet: URL:https://en.wikipedia.org/wiki/Aryl.

Ionova, N.I. et al., "Synthesis, structure, and properties of new antioxidants based on hydroxypropylated-aminodiphenylamine", Petroleum Chemistry, Nauka/Interperiodica, MO, vol. 51, No. 6, Nov. 20, 2011, pp. 454-457, XP019981028, ISSN: 1555-6239, DOI: 10.1134/S0965544111060053.

International Search Report, PCT/US2020/039280, date of mailing: Sep. 21, 2020, Authorized officer: Sandra Lanz.

\* cited by examiner

POLYMER POLYOL COMPOSITIONS AND THEIR USE IN THE PRODUCTION OF FLEXIBLE POLYURETHANE FOAMS

CROSS-REFERENCE TO RELATED APPLICATION

This application is a National Phase Application of PCT/US2020/039280, filed Jun. 24, 2020, which claims priority to U.S. Provisional Application No. 62/872,401, filed Jul. 10, 2019, each of which is being incorporated herein by reference.

FIELD

This specification pertains generally to polymer polyol compositions that include an amino diphenylamine as well as to the use of such polymer polyol compositions in the production of flexible polyurethane foams.

BACKGROUND

Polymer polyols, also known as filled polyols, are dispersions of polymer particles in a base polyol. They can be particularly suitable for preparing foams with higher hardness levels than a conventional, unmodified, polyol can produce and are often used in the production of flexible polyurethane foams by reacting the polyol with a polyisocyanate in the presence of a blowing agent and other ingredients, such as catalyst, surfactant and antioxidant. In many cases, the polyol is a polyether polyol that is an alkoxylation reaction product of one or more H-functional starters and one or more alkylene oxides. Often, due to the hydrophobic quality produced in the resulting polyether polyol, propylene oxide is the primary or sole alkylene oxide employed.

One drawback of polyether polyols, particular those produced using propylene oxide as the alkylene oxide, is that they can be susceptible to thermal oxidative degradation, which can produce a variety of volatile organic compounds (VOCs), such as formaldehyde and acetaldehyde. As a result, antioxidants (AOs) are often used to reduce the thermal oxidative degradation of polyether polyols. Aminic antioxidants are sometimes used and can be very effective at reducing VOC emissions in polyurethane foam raw materials, such as polyols, and polyurethane foams. However, AOs are sometimes disfavored because they themselves are often detected as a VOC during the emissions testing of foam. Therefore, phenolic antioxidants are often used as an alternative to aminic antioxidants. The use of phenolic antioxidant alone, however, may not be sufficient to meet stringent VOC emission and other requirements for the resulting foam.

As a result, it would be desirable to provide polymer polyol compositions that include an AO that is particularly effective at reducing VOC emissions from the polymer polymer composition as well as from flexible polyurethane foams formed from such compositions, particularly emissions of formaldehyde and acetaldehyde, while also being capable of reaction into the polyurethane matrix, thereby reducing the likelihood of emission of the AO from the foam during testing thereof.

SUMMARY

In certain respects, this specification relates to polymer polyol compositions. The polymer polyol compositions comprise a dispersion of polymer particles in a polyol, in which the polymer particles comprise at least one of: (1) a polymer comprising the free radical polymerization reaction product of an ethylenically unsaturated compound; (2) a polyisocyanate polyaddition polymer comprising the reaction product of a reaction mixture comprising an isocyanate and an alkanolamine; and (3) a polyhydrazodicarbonamide comprising the reaction product of a reaction mixture comprising an isocyanate and a diamine and/or a hydrazine. The polymer polyol compositions also comprise an amine of the structure:

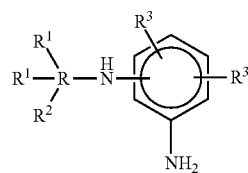

in which R is an aryl radical, each $R^1$ is independently hydrogen, a $C_1$-$C_4$ alkyl radical, or a $C_1$-$C_4$ alkoxy radical, $R_2$ is hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

The present specification is also directed to foam-forming compositions that include such polymer polyol compositions, flexible foams produced from such foam-forming compositions, and methods of producing flexible foams using such foam-forming compositions.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" or "OH number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1× 1000)/OH number.

As used herein, "monomer" means the simple unpolymerized form of a chemical compound having relatively low molecular weight, e.g., acrylonitrile, styrene, methyl methacrylate, and the like.

As used herein, "polymerizable ethylenically unsaturated compound" means a compound containing ethylenic unsaturation (C═C, i.e., two double bonded carbon atoms) that is capable of undergoing free radically induced addition polymerization reactions.

As used herein, "pre-formed stabilizer" means an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

As used herein "viscosity" is in millipascal-seconds (mPas) measured at 25° C. on an Anton Paar SVM3000 viscometer.

As indicated, certain implementations of the present specification are directed to polymer polyol compositions comprise a dispersion of polymer particles in a polyol. In some embodiments, the polymer polyol composition are characterized by a solids content, i.e., content of polymer particles, of 30% by weight to 75% by weight, such as 35% by weight to 70% by weight, 40% by weight to 60% by weight, or 45% by weight to 55% by weight, based on the total weight of the polymer polyol composition. Moreover, in certain implementations, the polymer polyol composition has a viscosity (as defined above) of less than 50,000 mPas, such as less than 40,000 mPas, less than 30,000 mPas, less than 20,000 mPas or, in some cases, less than 10,000 mPas.

In some embodiments, the polymer particles comprise a polymer comprising the free radical polymerization reaction product of an ethylenically unsaturated compound. More particularly, in some of these embodiments, the polymer polyol composition comprises a reaction product of a reaction mixture comprising: (a) a base polyol having a functionality of 2 to 8 and a hydroxyl number of 20 to 400; (b) an ethylenically unsaturated compound, (c) a preformed stabilizer, and (d) a free radical initiator.

Suitable base polyols include, for example, polyether polyols having a functionality of 2 to 8, such as 2 to 6 or 3 to 6, and an OH number of 20 to 400 mg KOH/g, 20 to 200 mg KOH/g, 20 to 150 mg KOH/g, 20 to 100 mg KOH/g, or, in some cases, 20 to 50 mg KOH/g, 25 to 50 mg KOH/g, or 30 to 50 mg KOH/g.

Specific examples of suitable base polyols include polyoxyethylene glycols, polyoxyethylene triols, polyoxyethylene tetrols and higher functionality polyoxyethylene polyols, polyoxypropylene glycols, polyoxypropylene triols, polyoxypropylene tetrols and higher functionality polypropylene polyols, mixtures thereof. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylenediamine, toluene diamine, etc. The alkoxylation reaction may be catalyzed using any conventional catalyst including, for example, potassium hydroxide (KOH) or a double metal cyanide (DMC) catalyst.

Other suitable polyether polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside and ethyl glucoside, glycol glucosides, such as ethylene glycol glycoside, propylene glycol glucoside, glycerol glucoside, and 1,2,6-hexanetriol glucoside, as well as alkylene oxide adducts of the alkyl glycosides.

Other suitable base polyols include the polyphenols, such as the alkylene oxide adducts thereof, wherein the alkylene oxides have from 2 to 4 carbon atoms. Among the polyphenols which are suitable are, for example, bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis(hydroxyphenol)ethanes.

The alkylene oxide adducts of phosphorus and polyphosphorus acid are also suitable base polyols. These include ethylene oxide, 1,2-epoxy-propane, the epoxybutanes, 3-chloro-1,2-epoxypropane as alkylene oxides. Phosphoric acid, phosphorus acid, polyphosphoric acids, such as tripolyphosphoric acid, and the polymetaphosphoric acids are suitable for use herein.

In some implementations, the base polyol comprises an aminocrotonate reaction product of a reaction mixture comprising a polyfunctional acetoacetic acid ester and an amine, such as where the polyfunctional acetoacetic acid ester is the reaction product of reaction mixture comprising: (i) a polyol with a functionality of 2 to 8 and an OH number of 20 to 400 mg KOH/g; and (ii) an alkyl-substituted acetoacetate.

In certain implementations, the polyol used to prepare the polyfunctional acetoacetic acid ester comprises a polyether polyol having a functionality of 2 to 8, such as 2 to 6 or 3 to 6, and an OH number of 20 to 400 mg KOH/g, 20 to 200 mg KOH/g, 20 to 150 mg KOH/g, 20 to 100 mg KOH/g, or, in some cases, 20 to 50 mg KOH/g, 25 to 50 mg KOH/g, or 30 to 50 mg KOH/g and can comprise, for example, any of the polyols described above.

The acetoacetic acid ester can be prepared by, for example, transesterifying any of the above described polyols with an alkyl acetoacetate containing one to five carbon atoms in the alkyl group. Specific useful acetoacetates include methyl acetoacetate, ethyl acetoacetate, t-butyl acetoacetate, and/or propyl acetoacetate. In preparing the acetoacetic acid ester, a transesterification catalyst may be used and it may be desirable that the reactants are used in amounts such that one OH group is present for each acetoacetate group. However, it is also possible to use excess amounts of either reactant. In fact, it may be desirable to use an excess of the acetoacetate to ensure complete reaction.

To produce the aminocrotonate reaction product, the resulting polyfunctional acetoacetic acid ester is then reacted with an amino diphenylamine of the structure:

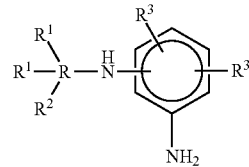

in which R is an aryl radical, each $R^1$ is independently hydrogen, a $C_1$-$C_4$ alkyl radical, or a $C_1$-$C_4$ alkoxy radical, $R_2$ is hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

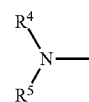

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

Specific examples of such amines include, but are not limited to, 4-aminodiphenylamine, 4-amino-4'-methyl diphenylamine, 4-amino-4'-methoxy diphenylamine, 4-amino-4'-ethoxy diphenylamine, 4-amino-4'-(N,N-dimethylamine) diphenylamine, and 4-amino-4'-isopropyl diphenylamine.

In certain implementations, a catalyst is used to catalyst the aminocrotonate reaction. In some cases, the catalyst is selected from the group consisting of boron trifluoride etherate, and organic acids having a pKa of 0.01 to 0.8, such as trifluoroacetic acid (pKa: 0.23), p-toluene sulfonic acid (pKa: 0.7) and halogenated organic acids having pKa values of 0.1 to 0.8. In some implementations, the catalyst is added in amounts of from 0.05 to 2.0 mol %, such as 0.3 to 1.0 mol %, based on the equivalents of acetoacetate present, which corresponds to 0.01 to 0.2% by weight, such as 0.05 to 0.10% by weight, based on the weight of the polyfunctional acetoacetic acid ester.

The amount of amino diphenylamine is generally selected so that one mole of amine is available for every acetoacetate equivalent. It is possible to react less than one mole amine with one equivalent of acetoacetate. This might result in a lower conversion if the reaction is terminated before all acetoacetate groups have reacted with amine groups, or in chain extension if all acetoacetate groups have reacted. On the other hand, in order to suppress chain extension and to obtain low viscosity products, it might be advantageous to use more than one mole amine per equivalent of acetoacetate. The unreacted amine can either be stripped off once the reaction is complete, or can remain in the product.

The reaction is generally carried out at a temperature of 40° to 200° C., such as 90° to 140° C., under excess pressure, reduced pressure, or, in some cases, in the substantial absence of pressure. The process can be conducted continuously or discontinuously. In general, the acetoacetic acid ester, the amines, and the catalyst can be reacted in the following order: acetoacetylated polyol, followed by amine and the catalyst. The reaction is considered complete when the peak at 1740 cm of the IR spectrum has disappeared. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled.

Of course, blends or mixtures of various useful polyols may be used if desired.

Suitable ethylenically unsaturated compounds for use in the reaction mixture to produce the polymer polyol composition include, for example, aliphatic conjugated dienes, such as butadiene and isoprene, monovinylidene aromatic monomers, such as styrene, α-methylstyrene, (t-butyl)styrene, chlorostyrene, cyanostyrene and bromostyrene; α,β-ethylenically unsaturated carboxylic acids and esters thereof, such as acrylic acid, methacrylic acid, methyl methacrylate, ethyl acrylate, 2-hydroxyethyl acrylate, butyl actylate, itaconic acid, and maleic anhydride, α,β-ethylenically unsaturated nitriles and amides, such as acrylonitrile, methacrylonitrile, acrylamide, methacrylamide, N,N-dimethyl acrylamide, and N-(dimethylaminomethyl)-acrylamide, vinyl esters, such as vinyl acetate, vinyl ethers, vinyl ketones, and vinyl and vinylidene halides, among others. Of course, mixtures of two or more of the aforementioned monomers are also suitable. In some embodiments, the ethylenically unsaturated monomer comprises at least one of styrene and its derivatives, acrylonitrile, methyl acrylate, methyl methacrylate, and vinylidene chloride.

In some embodiments, the ethylenically unsaturated compound comprises styrene and acrylonitrile. More specifically, in some implementations, styrene and acrylonitrile are used in sufficient amounts such that the weight ratio of styrene to acrylonitrile (S:AN) is within the range of 80:20 to 20:80, such as 75:25 to 25:75.

In some embodiments, the ethylenically unsaturated compound comprises a reaction product of an amine-reactive ethylenically unsaturated compound with an amino diphenylamine. For example, in some implementations, the ethylenically unsaturated compound comprises a compound having the structure:

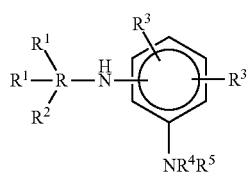

in which R is an aryl radical, each $R^1$ is independently hydrogen, a $C_1$-$C_4$ alkyl radical, or a $C_1$-$C_4$ alkoxy radical, $R_2$ is hydrogen or a $C_1$-$C_4$ alkyl radical, each $R^3$ is independently hydrogen, a $C_1$-$C_4$ alkyl radical, a $C_1$-$C_4$ alkoxy radical, or a radical of the formula:

in which $R^6$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^7$ is hydrogen or a $C_1$-$C_{12}$ alkyl radical, and $R^4$ and $R^5$ are each independently hydrogen or an ethylenically unsaturated moiety derived from an amine-reactive ethylenically unsaturated compound, with the proviso that at least one of $R^4$ and $R^5$ is an ethylenically unsaturated moiety derived from an amine-reactive ethylenically unsaturated compound. Such units may be incorporated into the structure of the polymer particles by a variety of methods, including those mentioned below.

Such ethylenically unsaturated compounds can be produced by reacting amine-reactive ethylenically unsaturated compound with an amino diphenylamine of the structure:

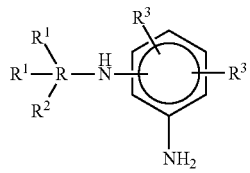

in which R is an aryl radical, each $R^1$ is independently hydrogen, a $C_1$-$C_4$ alkyl radical, or a $C_1$-$C_4$ alkoxy radical, $R_2$ is hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

Specific examples of such amines include, but are not limited to, any of the isomers of aminodiphenylamine, such as 4-aminodiphenylamine 3-aminodiphenylamine, and 2-aminodiphenylamine, 4-amino-4'-methyl diphenylamine, 4-amino-4'-methoxy diphenylamine, 4-amino-4'-ethoxy diphenylamine, 4-amino-4'-(N,N-dimethylamine) diphenylamine, and 4-amino-4'-isopropyl diphenylamine.

Exemplary amine-reactive ethylenically unsaturated compounds for reaction with the foregoing amino diphenylamine include, for example, ethylenically unsaturated compounds that contain acid, acid anhydride, oxirane, and/or isocyanate functionality. Specific examples of suitable ethylenically unsaturated carboxylic acids are maleic acid, fumaric acid, itaconic acid, acrylic acid, methacrylic acid, and crotonic acid. Specific examples of suitable ethylenically unsaturated acid anhydrides are maleic anhydride and itaconic anhydride. Specific examples of suitable ethylenically unsaturated oxiranes are glycidyl acrylate, glycidyl methacrylate, and glycidyl ethacrylate, and 4-vinyl-1-cyclohexene-1,2-epoxide. Specific examples of suitable ethylenically unsaturated isocyanates are isopropenyl dimethyl benzyl isocyanate, 2-isocyanatoethyl methacrylate, adduct of isophorone diisocyanate and 2-hydroxyethyl methacrylate, and adducts of toluenediisocyanate and 2-hydroxypropyl acrylate.

Examples of such reactions are illustrated below. Reaction I illustrates the reaction of a diamine with glycidyl methacrylate, whereas Reaction II illustrates the diamine reacted with isopropenyl dimethylbenzylisocyanate.

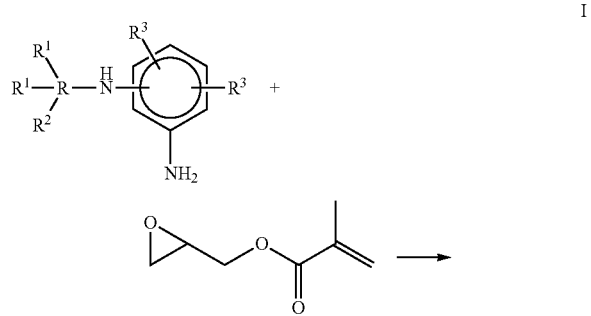

I

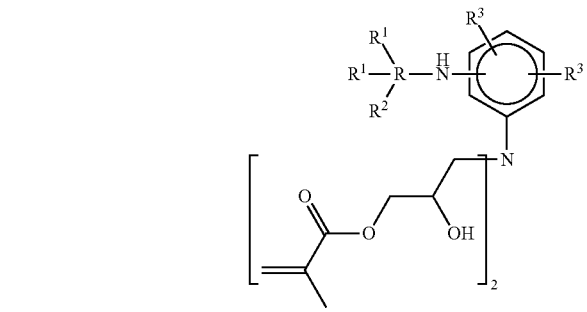

II

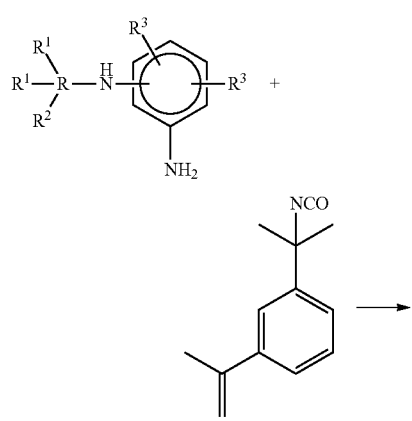

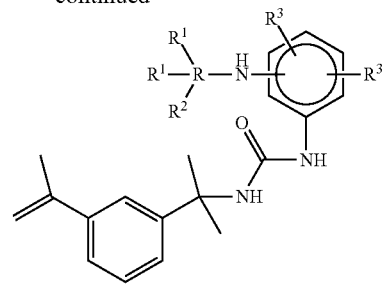

In some implementations, the foregoing reaction product of an amine-reactive ethylenically unsaturated compound and an amino diphenylamine is used in an amount of 0.1% by weight to 20% by weight, based on the total weight of ethylenically unsaturated compound.

In some implementations, the pre-formed stabilizer used to produce the polymer polyol composition comprises the reaction product of a reaction mixture comprising: (a) a macromer that contains reactive unsaturation, (b) an ethylenically unsaturated compound, (c) a free radical initiator, (d) a polymer control agent; and, in some cases, (e) a chain transfer agent.

In some implementations, the macromer utilized to produce the pre-formed stabilizer comprises the reaction product of a reaction mixture comprising: (i) an H-functional starter having a functionality of 2 to 8 and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, such as 0.05 to 2.5% by weight, or 0.1 to 1.5% by weight, based on 100% by weight of the sum of components (i), (ii) and (iii), of a diisocyanate.

Suitable preformed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and recovering a mixture containing the preformed stabilizer dispersed in the polymer control agent.

Suitable starters for use in preparing the macromer include compounds having a hydroxyl functionality of 2 to 8, such as 3 to 6, and a hydroxyl number of 20 to 50, such as 25 to 40. A specific example of a suitable starter is an alkylene oxide adduct of a hydroxyl functional compound, such as ethylene glycol, propylene glycol, diethylene glycol, dipropylene glycol, tripropylene glycol, glycerin, trimethylolpropane, pentaerythritol, sorbitol, ethylenediamine, and toluene diamine, among others, including mixtures of any two or more thereof, in which the alkylene oxide comprises, for example, propylene oxide, ethylene oxide, butylene oxide, or styrene oxide, among others, including mixtures of any two or more thereof. When a mixture of alkylene oxides are used to form the starter, a mixture of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possible to use a combination of simultaneous and sequential addition of alkylene oxides. In one embodiment, an alkylene oxide such as propylene oxide may be added first, and then a second alkylene oxide such as ethylene oxide added as a cap.

Other examples of suitable starters for preparing the macromer are polyoxyethylene glycols, triols, tetrols and higher functionality polyols, and mixtures thereof, as well as alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, and alkylene oxide adducts of polyhydroxyalkanes other than those described above. Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, and mannitol. Specific examples of alkylene oxide adducts of non-reducing sugars, include those where the alkoxides have from 2 to 4 carbon atoms. Non-reducing sugars and sugar derivatives include sucrose, alkyl glycosides, such as methyl glycoside and ethyl glucoside, glycol glucosides, such as ethylene glycol, glycoside, propylene glycol glucoside, glycerol glucoside, and 1,2,6-hexanetriol glucoside, and alkylene oxide adducts of the alkyl glycosides. Other suitable polyols starters for preparing the macromer include polyphenols, such as alkylene oxide adducts thereof, wherein the alkylene oxides have from 2 to 4 carbon atoms. Suitable polyphenols include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis(hydroxyphenol)ethanes.

In some implementations, the starter used to prepare the macromer has a functionality of from 3 to 6 and a hydroxyl number of from 25 to 40 mg KOH/g, and is prepared by reacting a starter such as glycerin, trimethylolpropane, pentaerythritol, dipentaerythritol, sorbitol, mannitol, or a mixture of any two or more thereof, with an alkylene oxide comprising at least one of propylene oxide and/or ethylene oxide. In some of these embodiments, ethylene oxide is utilized in an amount of 1 to 40% by weight, such as 5 to 30% by weight or 10 to 25% by weight, based on the total weight of the starter compound. In some embodiments, all or a portion of the ethylene oxide is added as a cap on the end of the starter compound. Suitable amounts of ethylene oxide to be added as a cap range from, for example, 1 to 40% by weight, such as 3 to 30% by weight or 5 to 25% by weight, based on the total weight of starter.

As indicated earlier, in some implementations, the reaction mixture used to produce the macromer utilized to produce the pre-formed stabilizer also comprises a hydroxyl-reactive compound that contains reactive unsaturation. Suitable such compounds include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, and adducts of toluenediisocyanate and 2-hydroxypropyl acrylate, among others, including mixtures of any two or more thereof.

As also indicated earlier, in some implementations, the reaction mixture used to produce the macromer utilized to produce the pre-formed stabilizer may also comprise a diisocyanate. Suitable diisocyanates include various isomers of diphenylmethane diisocyanate and isomeric mixtures of diphenylmethane diisocyanate, such as, for example, mixtures of 2,4'-diphenylmethane diisocyanate, 4,4'-diphenylmethane diisocyanate and/or 2,2'-diphenyl-methane diisocyanate. Other suitable isocyanates include toluenediisocyanate, isophoronediisocyanate, hexamethylenediisocyanate, and 4,4'-methylenebis(cyclohexyl isocyanate), among others, includes mixtures of any two or more thereof.

In certain implementations, the macromer is used in an amount of 10 to 40% by weight, such as 15 to 35% by weight, based on the total weight of the reaction mixture used to produce the pre-formed stabilizer.

As previously mentioned, in some implementations, the reaction mixture used to form the pre-formed stabilizer used to produce the polymer polyol composition also comprises an ethylenically unsaturated compound. Suitable such ethylenically unsaturated compounds are aliphatic conjugated dienes, such as butadiene and isoprene, monovinylidene aromatic monomers such as styrene, α-methylstyrene, (t-butyl)styrene, chlorostyrene, cyanostyrene and bromostyrene, α,β-ethylenically unsaturated carboxylic acids and esters thereof, such as acrylic acid, methacrylic acid, methyl methacrylate, ethyl acrylate, 2-hydroxyethyl acrylate, butyl acrylate, itaconic acid, maleic anhydride and the like, α,β-ethylenically unsaturated nitriles and amides, such as acrylonitrile, methacrylonitrile, acrylamide, methacrylamide, N,N-dimethyl acrylamide, N-dimethylaminomethyl)acrylamide and the like, vinyl esters, such as vinyl acetate; vinyl ethers, vinyl ketones, vinyl and vinylidene halides, as well as a wide variety of other ethylenically unsaturated materials which are copolymerizable with the macromer, including mixture of any two or more thereof.

In some implementations, the reaction mixture used to form the pre-formed stabilizer used to produce the polymer polyol composition comprises an ethylenically unsaturated monomer comprising a mixture of acrylonitrile and at least one other ethylenically unsaturated comonomer which is copolymerizable with acrylonitrile, such as, for example, styrene and its derivatives, acrylates, methacrylates, such as methyl methacrylate, vinylidene chloride, among others, as well as mixtures of any two or more thereof. When using acrylonitrile with a comonomer, it is sometimes desirable that a minimum of 5 to 15% by weight acrylonitrile be maintained in the system. One specific ethylenically unsaturated monomer mixture suitable for making the preformed stabilizer comprises mixtures of acrylonitrile and styrene in which, for example, acrylonitrile is used in an amount of 20 to 80% by weight, such as 30 to 70% by weight, based on the total weight of the monomer mixture, and styrene is used in an amount of 80 to 20% by weight, such as 70 to 30% by weight percent, based on the total weight of the monomer mixture.

In certain implementations, the ethylenically unsaturated compound is used in an amount of 10 to 30% by weight, such as 15 to 25% by weight, based on the total weight of the reaction mixture used to produce the pre-formed stabilizer.

The reaction mixture used to produce the pre-formed stabilizer, in certain implementations, also include a free radical initiator. Exemplary suitable free-radical initiators include peroxides, including both alkyl and aryl hydroperoxides, persulfates, perborates, percarbonates, and azo compounds. Some specific examples include hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile). In some cases, the catalyst selected is one having a half-life that is 25 percent or less of the residence time in the reactor at a given temperature. Representative examples of useful initiators species include t-butyl peroxy-2-ethyl-hexanoate, t-butylperpivalate, t-amyl peroctoate, 2,5-dimethyl-hexane-2,5-di-per-2-ethyl hexoate, t-butylpemeodecanoate, and t-butylperbenzoate, as well as azo compounds, such as azobis-isobutyronitrile, 2,2'-azo bis-(2-methylbutyro-nitrile), and mixtures thereof.

In some implementations, the free radical initiator is used in an amount of 0.01 to 2% by weight, such as 0.05 to 1% by weight or 0.05 to 0.3% by weight, based on the total weight of the reaction mixture used to produce the pre-formed stabilizer.

The reaction mixture used to produce the pre-formed stabilizer, in certain implementations, also include a polymer control agent. Suitable polymer control agents include various mono-ols (i.e. monohydroxy alcohols), aromatic hydrocarbons, and ethers. Specific examples of suitable polymer control agents are alcohols containing at least one carbon atom, such as methanol, ethanol, n-propanol, isopropanol, n-butanol, sec.-butanol, t-butanol, n-pentanol, 2-pentanol, 3-pentanol, and the like, and mixtures of any two or more thereof. Other suitable polymer control agents include ethylbenzene and toluene. The polymer control agent can be used in substantially pure form (i.e. as commercially available) or can be recovered in crude form from the polymer polyol production process and reused as-is. For instance, if the polymer control agent is isopropanol, it can be recovered from the polymer polyol process and used at any point in a subsequent product campaign in which the isopropanol is present.

In certain implementations, the polymer control agent is used in an amount of 30 to 80% by weight, such as 40 to 70% by weight, based on the total weight of the reaction mixture used to produce the pre-formed stabilizer.

As previously indicated, the reaction mixture used to produce the pre-formed stabilizer, in certain implementations, may also include a chain transfer agent. Suitable chain transfer agents include alkylene oxide adducts having a hydroxyl functionality of greater 3. In some implementations, the chain transfer agent is the same as or equivalent to the polyol used in the formation of precursor used to prepare the preformed stabilizer. In certain implementations, the chain transfer agent is used in an amount of 0 to 40% by weight, such as 0 to 20% by weight, or, in some cases, 0 to 10% by weight, based on the total weight of the reaction mixture used to produce the pre-formed stabilizer.

The preformed stabilizer can be produced by a process similar to that of making the polymer polyol. The temperature range is not critical and may vary from, for example, 80° C. to 150° C., such as 115° C. to 125° C. The mixing conditions employed can, for example, be those obtained using a back mixed reactor (e.g.—a stirred flask or stirred autoclave).

As indicated earlier, the reaction mixture used to produce certain implementations of the polymer polyol composition also comprises a free radical initiator, particular where the polymer particles are the free radical polymerization reaction product of an ethylenically unsaturated compound. Suitable such free-radical initiators include, for example, any of those described previously with respect to the production of the preformed stabilizer. In certain implementations, the free-radical initiator is present in the reaction mixture used to produce the polymer polyol composition in an amount of 0.01 to 2% by weight, based on 100% by weight of the final polymer polyol composition.

In some implementations, the reaction mixture used in preparing the polymer polyol composition further comprises a chain transfer agent. Examples of suitable chain transfer agents are mercaptans, such as dodecane thiol, ethane thiol, octane thiol, and toluene thiol, halogenated hydrocarbons, such as carbon tetrachloride, carbon tetrabromide, and chloroform, amines, such as diethylamine, and enol-ethers. In some embodiments, if used, the chain transfer agent is used in an amount of 0.1 to 2% by weight, such as 0.2 to 1% by weight, based on the total weight of the reaction mixture used to produce the polymer polyol.

The foregoing polymer polyol compositions can be made using any process (including continuous and semi-batch) and reactor configuration that is known to be suitable to prepare polymer polyols, such as, for example, a two-stage reaction system comprising a continuously-stirred tank reactor (CSTR) fitted with impeller(s) and baffles (first-stage) and a plug-flow reactor (second stage). Furthermore, the reaction system can utilize a wide range of mixing conditions. The reaction system may be characterized by energy inputs of from 0.5 to 350 horsepower per 1000 gallons, such as 2 to 50 horsepower per 1000 gallons on average for the bulk phase volume of each reactor as a particularly useful mixing power input. Mixing can be provided by any combination of impeller(s) and pump-around loop/jet mixing. In addition, such polymer polyols compositions can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare polymer polyols, a residence time ranging of 20 to 180 minutes for the first reactor may be particularly useful.

In some implementations, the reactants are pumped from feed tanks through an in-line static mixer, and then, through a feed tube into the reactor. It may be particularly useful to prepare a premix of the initiator with part of the polyol stream, as well as of polyol and stabilizer. In general, feed stream temperatures are ambient (i.e. 25° C.). However, if desired, feed streams can be heated prior to mixing and entering the reactor. Other process conditions, which may be useful, include cooling of the feed tube in the reactor. Furthermore, the suitable reaction conditions for polymer polyols in general may be characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling.

In many cases, the polymer polyol compositions are produced by utilizing a low monomer to polyol ratio which is maintained throughout the reaction mixture during the process. This can be achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol. The temperature range is not critical and may vary from, for example, 80° C. to 200° C., 100° C. to 140° C., or, in some cases, 115° C. to 125° C.

One suitable continuous process for making polymer polyol compositions as described above comprises (1) providing a heterogenous mixture of the preformed stabilizer and, optionally, liquid diluent, in combination with a polyol, a free radically polymerizable ethylenically unsaturated compound, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated compound to form a heterogenous mixture containing the enhanced polymer polyol, unreacted monomers and diluent, and stripping the unreacted monomers and diluent from the enhanced polymer polyol to recover the unreacted monomers and diluent.

In some implementations, the polymer particles (whether individual particles or agglomerates of individual particles) are relatively small in size and, in some cases, have a weight average diameter less than ten microns.

Following polymerization, volatile constituents, in particular those from the PCA and residues of monomers are generally stripped from the product by, for example, vacuum distillation, such as in a thin layer of a falling film evaporator. The monomer-free product may be used as is, or may be filtered to remove any large particles that may have been created. In some cases, all of the product will pass through the filter employed in the 150 mesh filtration hindrance test.

In some embodiments, the polymer particles comprise, in addition to or in lieu of the polymer described above, a polyisocyanate polyaddition polymer ("PIPA") comprising the reaction product of a reaction mixture comprising an isocyanate and an alkanolamine, such as triethanolamine. In some implementations, such PIPA polyols can be produced by (i) reacting an isocyanate and a first alkanolamine in the presence of a substantially inert polyol to produce a reaction mixture; and (ii) adding a second alkanolamine which may be the same as or different from the first alkanolamine to the reaction mixture prior to completion of the reaction between the isocyanate and the first alkanolamine to produce the polymer-modified polyol dispersion.

Suitable isocyanates for preparing PIPA polyols include, without limitation, aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydrotoluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

Suitable alkanolamines for preparing PIPA polyols include monoethanolamine, diethanolamine, dimethylethanolamine, triethanolanine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethylisopropanolamine, N-propylisopropanolamine and mixtures thereof.

The base polyol suitable for use in such PIPA polyols includes any of those base polyols described earlier in this specification.

In certain implementations of the process for preparing PIPA polyols mentioned above, the isocyanate and the first alkanolamine are first used in amounts such that the ratio of isocyanate groups to hydroxyl groups is in the range of 0.33:1 to 1:1, and, in the second step of the process, the second alkanolamine is added in an amount of 0.5 to 10, percent by weight based on the weight of the mixture produced in the first step in the process.

As will be appreciated, the reaction between the isocyanate and the first alkanolamine may be conducted in the presence of a polyurethane reaction catalyst, such as tin octoate, dibutyl-tin dilaurate, triethylenediamine and mixtures thereof. The process may be a batch process an in-line blending technique may be used.

In some embodiments, the polymer particles comprise, in addition to or in lieu of the polymer described above and/or the PIPAs described above, a polyhydrazodicarbonamide ("PHD") comprising the reaction product of a reaction mixture comprising an isocyanate and a diamine and/or a hydrazine. Suitable PHD polyols are typically prepared by the in-situ polymerization of an isocyanate mixture with an amine group containing compound such as, a diamine and/or a hydrazine, in a base polyol. Suitable base polyols include any of the base polyols described earlier in this specification.

In some implementations, the PHD polyol has a solids content of 3 to 30 wt % by weight, such as 5 to 25% by weight, based on the total weight of the PHD polyol. Moreover, in some implementations, the isocyanate mixture comprises 80 parts by weight, based on the total weight of the isocyanate mixture, of 2,4-toluene diisocyanate, and 20 parts by weight, based on the total weight of the isocyanate mixture, of 2,6-toluene diisocyanate.

Suitable amines for polymerization with the isocyanate in preparing the PHD polyols, include, for example, polyamines, hydrazines, hydrazides, ammonia or mixtures of ammonia and/or urea and formaldehyde. Suitable polyamines include divalent and/or higher valent primary and/or secondary aliphatic, araliphatic, cycloaliphatic and aromatic amines, such as ethylene diamine, 1,2- and 1,3-propylene diamine, tetramethylene diamine, hexamethylene diamine, dodecamethylene diamine, trimethyl diaminohexane, N,N'-dimethyl-ethylenediamine, 2,2'-bisaminopropyl-methylamine, higher homologues of ethylene diamine, such as diethylene triamine, triethylene tetramine and tetraethylene pentamine, homologues of propylene diamine, such as dipropylene triamine, piperazine, N,N'-bis-amino-ethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines, condensates of aniline and formaldehyde, tolylene diamines, bis-aminomethylbenzenes and derivatives of the above mentioned aromatic amines monoalkylated on one or both nitrogen atoms. The polyamines generally have a molecular weight of from 60 to 10,000 Da, such as 60 to 1000 Da, or 60 to 200 Da.

Suitable hydrazines include hydrazine itself or monosubstituted or N,N'-disubstituted hydrazines, in which the substituents are $C_1$ to $C_6$ alkyl groups, cyclohexyl groups or phenyl groups. The hydrazines generally have a molecular weight of from 32 to 200.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid, the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), such as with the above mentioned diamines and polyamines. The hydrazides generally have a molecular weight of from 90 to 10,000, such as 90 to 1000 or 90 to 500.

In addition to the polymer particles and base polyol described above, the polymer polyol compositions of this specification also comprise an amine of the structure:

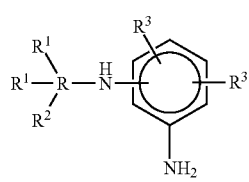

in which R is an aryl radical, each $R^1$ is independently hydrogen, a $C_1$-$C_4$ alkyl radical, or a $C_1$-$C_4$ alkoxy radical, $R_2$ is hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

Specific examples of such amines include, but are not limited to, any of the isomers of aminodiphenylamine, such as 4-aminodiphenylamine, 3-aminodiphenylamine, and 2-aminodiphenylamine, 4-amino-4'-methyl diphenylamine, 4-amino-4'-methoxy diphenylamine, 4-amino-4'-ethoxy diphenylamine, 4-amino-4'-(N,N-dimethylamine) diphenylamine, and 4-amino-4'-isopropyl diphenylamine.

In certain implementations, the foregoing amine is used in an amount of 100 to 2000 ppm, such as 200 to 1500 ppm, based on the total weight of the polymer polyol composition.

It has been discovered, surprisingly, that inclusion of the amino diphenylamine described herein in a polyol composition can reduce emissions of formaldehyde and acetaldehyde from the polyol composition to an extent surprisingly greater than other amine antioxidants. Furthermore, amine emissions are reduced due to the reactivity of the amino diphenylamine, particularly the primary amine, with an isocyanate during production of polyurethane foam.

If desired, the polymer polyol compositions of this specification may comprise other ingredients, including, for example, other antioxidants. For example, in some implementations, the polymer polyol composition may further comprise a phenolic antioxidant, such as any of the phenolic antioxidants disclosed in United States Patent Application Publication No. US 2011/0054220 A1 at [0013]-[0078], the cited portion of which being incorporated herein by reference. For example, in some implementations, the phenolic antioxidant may include one or more of the following compounds:

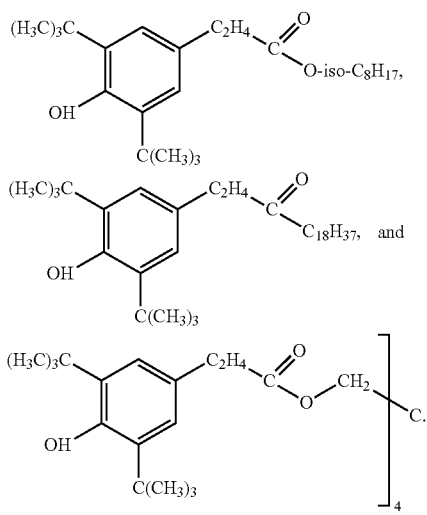

In some implementations, the phenolic antioxidant is present in an amount of 100 to 2000 ppm, such as 200 to 1500 ppm, based on the total weight of the polymer polyol composition.

Certain embodiments of this specification are directed to polyurethane foams produced using the polymer polyol compositions described above, as well to methods of manufacturing such polyurethane foam. As will be appreciated, polyurethane foams can be produced from reacting a reaction mixture comprising: (1) a polyisocyanate component and (2) an isocyanate-reactive component. The isocyanate-reactive component may comprise any of the polymer polyol compositions described above. In addition, the isocyanate-reactive component may include: (i) other polyols, such as a polyether polyol having a functionality of from 2 to 6, an OH number of from 18 to 238, and a number average molecular weight of from 160 to 8000, (ii) a blowing agent, (iii) a catalyst, and (iv) a surfactant.

Suitable blowing agents include halogenated hydrocarbons, halogenated olefins, water, liquid carbon dioxide, low boiling solvents such as, for example, pentane, and other known blowing agents. In some embodiments, the blowing agent comprises, or consists of, water. In certain implementations, blowing agent is used in an amount of 1 to 7 parts, such as 1 to 5 parts, by weight, based on the total weight of the isocyanate-reactive component.

Suitable catalysts include amine and tin based catalysts, such as diethylenetriamine, triethylenediamine, bis(2,2'-dimethylamino)ethyl ether, N,N,N',N'',N''-pentamethyldiethylenetriamine, dibutyltin dilaurate, dibutyltin diacetate, and stannous octoate, and the like. In certain implementations, catalyst is used in an amount of 0.001 to 2 parts by weight, based on the total weight of the isocyanate-reactive component.

In addition, the isocyanate-reactive component may, if desired, include a low molecular weight chain extender and/or cross-linking agent which has a molecular weight of, for example, below 300 Da. Examples include, but are not limited to, glycerine, pentaerythritol, ethylene glycol, sorbitol, and alkanolamines, such as monoethanolamine, diethanolamine (DEOA) and triethanolamine (TEOA). In certain implementations, such chain extender and/or cross-linking agent is used in an amount of up to 5 parts per by weight, such as 0.4 to 3.5 parts by weight, based on the total weight of the isocyanate-reactive component.

Suitable surfactants include, but are not limited to, commercially available polyetherpolysiloxane foam stabilizers.

The polyurethane foam can be prepared by reacting the polyisocyanate component with the isocyanate-reactive component, wherein the polyisocyanate component is present in an amount sufficient to, for example, provide an isocyanate index of 70 to 130, such as 80 to 120 or 90 to 115.

The preparation of free rise foams typically entails mixing all components (except for the isocyanate components) together, then adding the isocyanate component to the mixture and briefly mixing. The mixture is then poured into a box and allowed to rise freely. Settling of the foam is measured, and it is oven cured at, for example, 125° C. for 5 minutes. After 16 hours at room temperature, shrinkage is noted and the foam properties can then be determined by various tests.

The preparation of molded foams typically involves pre-mixing the polyol components along with additives. The isocyanate component is then added to the pre-mix in a sufficient amount to the desired isocyanate index. The reaction mixture is then dispensed by hand or machine into a metal mold which is typically preheated to a temperature of 62 to 66° C. The reaction mixture foams to fill the mold and, after 4 to 5 minutes, the foam is removed from the mold and (physically) crushed to ensure that all cells were opened; and then aged for 2 hours.

The non-limiting and non-exhaustive examples that follow are intended to further describe various non-limiting and non-exhaustive implementations without restricting the scope of the implementations described in this specification.

EXAMPLES

The following components were used in the examples.
Polyol 1: Polyether polyol; functionality of 3; OH no. 28 mg KOH/g; molecular weight 6,000; viscosity 1,160 mPa·s at 25° C.
Polyol 2: Polyoxyalkylene polymer polyol with hydroxyl number of 18.2-22.2 mg KOH/g, specific gravity at 25° C. of 1.06, and total solids content of 45 wt. %.
PPD N-Phenyl-p-phenylenediamine, obtained from SigmaAldrich
I-5057: Irganox® 5057, obtained from BASF
VOC Studies
Example 1: PPD was added to Polyol 1 at a concentration of 500 ppm. Said sample and its control, Polyol 1, were tested for emissions of formaldehyde and acetaldehyde via method USP-467 Residual Solvents (2008). The formaldehyde emissions of Example 1 were 99.8% less than that of the control, Polyol 1. The acetaldehyde emissions of Example 1 were 99.4% less than that of the control, Polyol 1.

Example 2: PPD was added to Polyol 2 at a concentration of 659 ppm. Said sample and its control, Polyol 2, were tested for emissions of formaldehyde and acetaldehyde via method USP-467 Residual Solvents (2008). The formaldehyde emissions of Example 2 were 99.7% less than that of the control, Polyol 2. The acetaldehyde emissions of Example 2 were 99.6% less than that of the control, Polyol 2.

Polyol Example 3 and Comparative Polyol Example 4: PPD and I-5057 were compared by preparing a Polyol 1 sample spiked with 500 ppm of PPD (Example 3) and a Polyol 1 sample spiked with 500 ppm of I-5057 (Comparative Example 4). Both samples were tested for emissions of formaldehyde and acetaldehyde via method USP-467 Residual Solvents (2008). The formaldehyde emissions of Example 3 were 99.8% less than that of the control, Polyol 1. The acetaldehyde emissions of Example 3 were 99.4% less than that of the control, Polyol 1. The formaldehyde emissions of Comparative Examples 4 were 94.6% less than that of the control, Polyol 1. The acetaldehyde emissions of Comparative Example 4 were 93.0% less than that of the control, Polyol 1.

Although not specifically tested, the detection limit for PPD in foams is expected to be below the VDA 278 detection limit for toluene equivalents (<20 ng) for VOC and hexadecane (<20 ng) equivalents for FOG. Moreover, although not specifically tested, it is expected that foam properties would not be significantly affected by the inclusion of PPD in the amounts contemplated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A polymer polyol composition comprising a dispersion of polymer particles in a base polyol, wherein:
(a) the polymer particles comprise at least one of:
(1) a polymer comprising the free radical polymerization reaction product of an ethylenically unsaturated compound;
(2) a polyisocyanate polyaddition polymer comprising the reaction product of a reaction mixture comprising an isocyanate and an alkanolamine; and
(3) a polyhydrazodicarbonamide comprising the reaction product of a reaction mixture comprising an isocyanate and a diamine and/or a hydrazine, and
(b) the polymer polyol composition further comprises an amine of the structure (I):

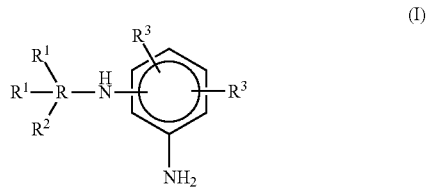

in which R is an aryl radical, each $R^1$ is independently hydrogen, a $C_1$-$C_4$ alkyl radical, or a $C_1$-$C_4$ alkoxy radical, each $R_2$ is independently hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

2. The polymer polyol composition of claim 1, wherein the polymer polyol composition has solids content of 30% by weight to 75% by weight, based on the total weight of the polymer polyol composition.

3. The polymer polyol composition of claim 1, wherein the polymer polyol composition comprises a reaction product of a reaction mixture comprising:
   (a) a base polyol having a functionality of 2 to 8 and a hydroxyl number of 20 to 400 mg KOH/g;
   (b) an ethylenically unsaturated compound,
   (c) a preformed stabilizer, and
   (d) a free radical initiator.

4. The polymer polyol composition of claim 3, wherein the ethylenically unsaturated compound comprises styrene and acrylonitrile.

5. The polymer polyol composition of claim 3, wherein the pre-formed stabilizer comprises the reaction product of a reaction mixture comprising:
   (1) a macromer that contains reactive unsaturation,
   (2) an ethylenically unsaturated compound,
   (3) a free radical initiator, and
   (4) a polymer control agent.

6. The polymer polyol composition of claim 5, wherein the macromer comprises the reaction product of a reaction mixture comprising:
   (i) an H-functional starter having a functionality of 2 to 8 and a hydroxyl number of 20 to 50 mg KOH/g;
   (ii) 0.1 to 3% by weight, based on the total weight of components (i), (ii) and (iii), of a hydroxyl-reactive compound that contains reactive unsaturation; and
   (iii) 0 to 3% by weight, based on the total weight of components (i), (ii) and (iii), of a diisocyanate.

7. The polymer polyol composition of claim 1, wherein the amine of the structure (I) comprises at least one of 4-aminodiphenylamine, 3-aminodiphenylamine, and 2-aminodiphenylamine.

8. The polymer polyol composition of claim 1, wherein the amine of the structure (I) is present in an amount of 100 to 2000 ppm, based on the total weight of the polymer polyol composition.

9. The polymer polyol composition of claim 1, further comprising a phenolic antioxidant comprising at least one of:

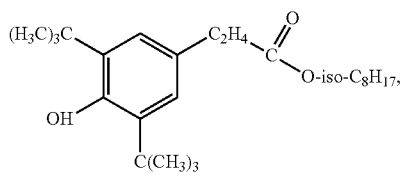

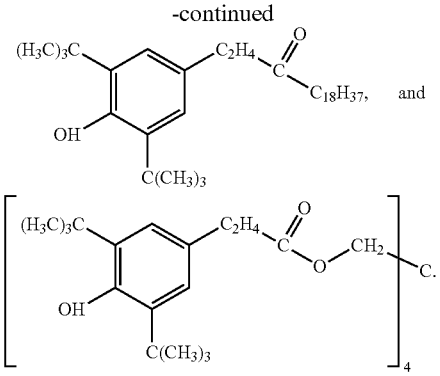

10. A method of making a polyurethane foam comprising reacting, at an isocyanate index of 70 to 130, a reaction mixture comprising:
   (1) a polyisocyanate component and
   (2) an isocyanate-reactive component comprising the polymer polyol composition of claim 1.

11. A polyurethane foam comprising a reaction product, at an isocyanate index of 70 to 130, of (1) a polyisocyanate component, and (2) an isocyanate-reactive component comprising the polymer polyol composition of claim 1.

12. A polymer polyol composition comprising:
   (a) a base polyol having a functionality of 2 to 8 and a hydroxyl number of 20 to 400 mg KOH/g; and
   (b) polymer particles dispersed in the base polyol, the polymer particles comprising the reaction product of a reaction mixture comprising:
      (1) an ethylenically unsaturated compound;
      (2) a preformed stabilizer comprising the reaction product of a reaction mixture comprising:
      (3) a free radical initiator; and
   (c) an amine of the structure (I):

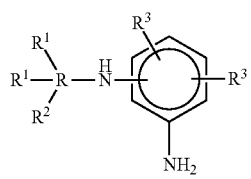

in which R is an aryl radical, each $R^1$ is independently hydrogen, a $C_1$-$C_4$ alkyl radical, or a $C_1$-$C_4$ alkoxy radical, each $R_2$ is independently hydrogen or a $C_1$-$C_4$ alkyl radical, and each $R^3$ is independently hydrogen, a $C_1$-$C_4$ alkyl radical, a $C_1$-$C_4$ alkoxy radical, or a radical of the formula:

in which $R^4$ is a $C_1$-$C_{12}$ alkyl radical, a $C_5$-$C_{12}$ cycloalkyl radical, a $C_6$-$C_{12}$ aryl radical, or a $C_7$-$C_{13}$ aralkyl radical, and $R^5$ is hydrogen or a $C_1$-$C_{12}$ alkyl radical.

13. The polymer polyol composition of claim 12, wherein the polymer polyol composition has solids content of 30% by weight to 75% by weight, based on the total weight of the polymer polyol composition.

14. The polymer polyol composition of claim 12, wherein the ethylenically unsaturated compound comprises styrene and acrylonitrile.

15. The polymer polyol composition of claim 12, wherein the pre-formed stabilizer comprises the reaction product of a reaction mixture comprising:
   (1) a macromer that contains reactive unsaturation,
   (2) an ethylenically unsaturated compound,
   (3) a free radical initiator, and
   (4) a polymer control agent.

16. The polymer polyol composition of claim 15, wherein the macromer comprises the reaction product of a reaction mixture comprising:
   (i) an H-functional starter having a functionality of 2 to 8 and a hydroxyl number of 20 to 50 mg KOH/g;
   (ii) 0.1 to 3% by weight, based on the total weight of components (i), (ii) and (iii), of a hydroxyl-reactive compound that contains reactive unsaturation; and
   (iii) 0 to 3% by weight, based on the total weight of components (i), (ii) and (iii), of a diisocyanate.

17. The polymer polyol composition of claim 12, wherein the amine of the structure (I) comprises at least one of 4-aminodiphenylamine, 3-aminodiphenylamine, and 2-aminodiphenylamine.

18. The polymer polyol composition of claim 12, wherein the amine of the structure (I) is present in an amount of 100 to 2000 ppm, based on the total weight of the polymer polyol composition.

19. A method of making a polyurethane foam comprising reacting, at an isocyanate index of 70 to 130, a reaction mixture comprising:
   (1) a polyisocyanate component and
   (2) an isocyanate-reactive component comprising the polymer polyol composition of claim 12.

20. A polyurethane foam comprising a reaction product, at an isocyanate index of 70 to 130, of (1) a polyisocyanate component, and (2) an isocyanate-reactive component comprising the polymer polyol composition of claim 12.

* * * * *